United States Patent Office 3,476,521
Patented Nov. 4, 1969

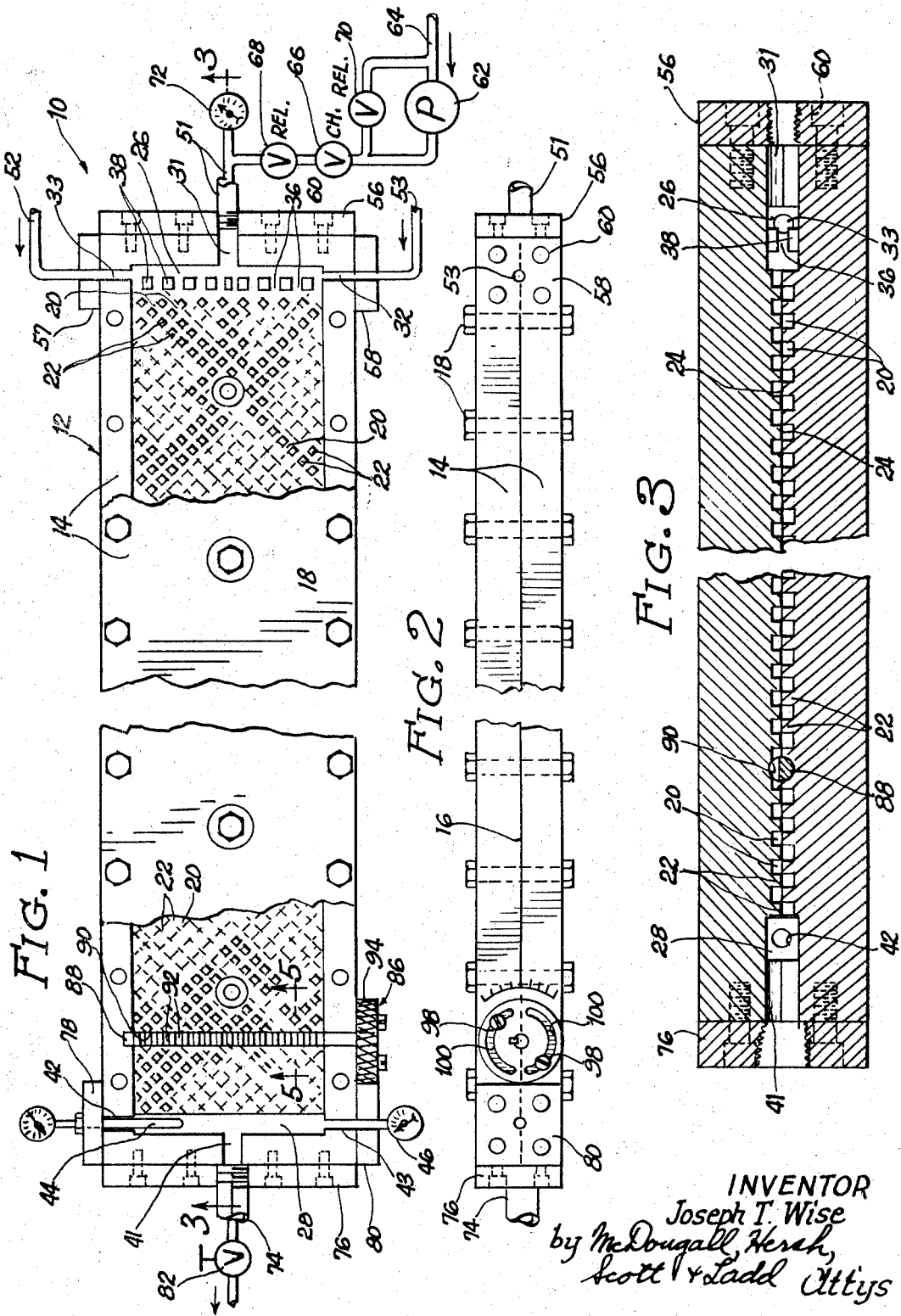

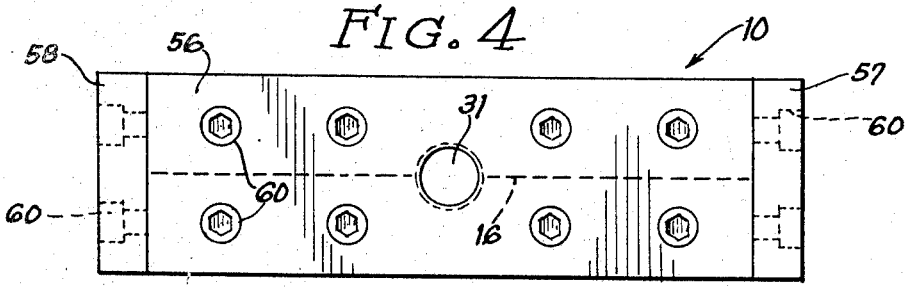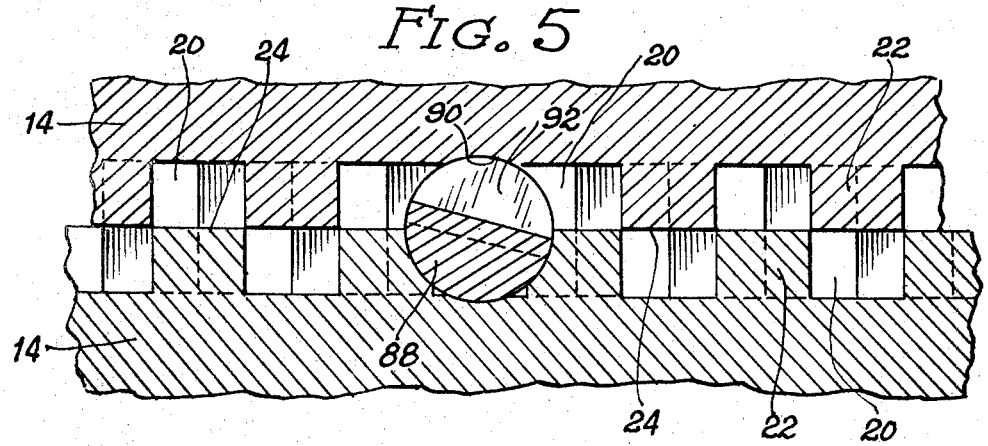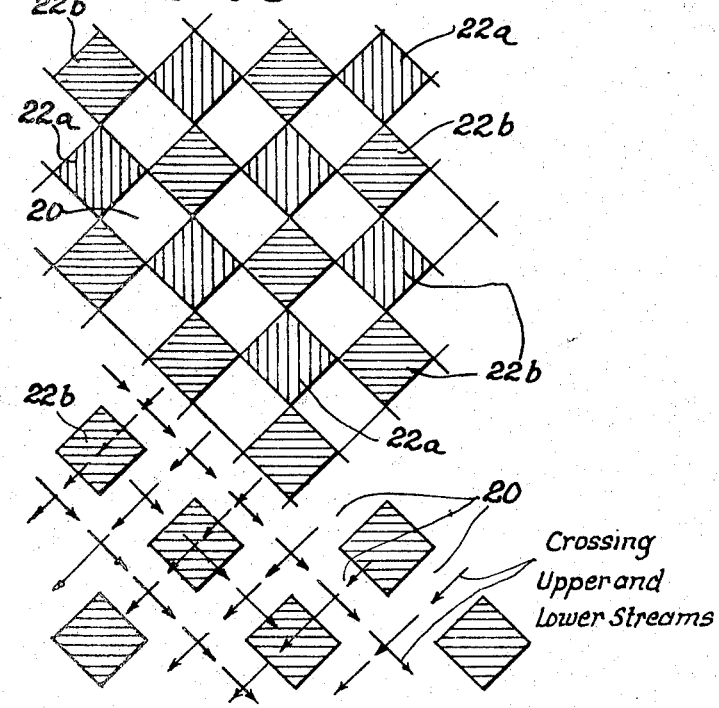

3,476,521
POLYMERIZING APPARATUS
Joseph T. Wise, 1737 W. 35th St., Chicago, Ill. 60609
Filed Jan. 20, 1967, Ser. No. 610,616
Int. Cl. B01j 3/00; F28f 3/14
U.S. Cl. 23—285
20 Claims

ABSTRACT OF THE DISCLOSURE

Polymerizing apparatus, particularly for continuously polymerizing liquid and gaseous hydrocarbon monomers, said apparatus including flat members secured together in opposed relation and formed with intersecting diagonal grooves with generally rectangular pillars therebetween; the pillars of the opposed members being offset so that the pillars of each member are opposite the grooves of the other member to maximize heat transfer; angularly related entrances for introducing the liquid and gaseous monomers between the opposed members; and a valve spindle rotatably mounted between the members and having passages movable into and out of registration with the grooves for regulating the flow of the hydrocarbons therealong.

---

This invention relates to apparatus for polymerizing various hydrocarbon monomers. The present invention is particularly applicable to the continuous polymerization of liquid and gaseous olefins or other hydrocarbon monomers.

Polymerizing devices have been known in the prior art, whereby the monomers to be polymerized have been caused to flow continuously through polymerizing passages, in which the polymerization of the monomers takes place under the influence of heat and pressure.

Some of the general objectives of the present invention are to provide more effective and uniform mixing of the monomers, particularly liquid and gaseous monomers, in the polymerizing apparatus; to provide more effective and uniform application of heat to the hydrocarbons as they pass along the polymerizing passages in the apparatus; to provide high polymerizing capacity, while minimizing the size of the apparatus; and to provide effective and accurate control of the flow of the hydrocarbons along the polymerizing passages, while also controlling the pressure of the polymerizing passages.

To accomplish these objectives, the present invention contemplates the provision of polymerizing apparatus, including first and second opposed members with polymerizing passages therebetween, first means providing at least one entrance for hydrocarbons into the polymerizing passages, and second means providing an exit for the polymerized hydrocarbons at a point remote from said first means, the polymerizing passages being in the form of intersecting grooves formed in the opposed members, pillars being formed between the intersecting grooves, the pillars of the opposed members being offset, so that the pillars of each member are opposite the grooves in the opposite member, to provide for effective heat transfer between the pillars and the hydrocarbons flowing along the grooves. Preferably, the grooves intersect in rectangular relation. Moreover, the pillars are preferably rectangular. The grooves preferably extend diagonally to the linear direction between the entrance and the exit. The arrangement of the grooves and pillars provides effective mixing of the monomers, while also providing for highly effective and uniform heat transfer to the monomers flowing along the grooves. Preferably, at least two entrances are provided for liquid and gaseous monomers. The entrances are preferably angularly related, so that the monomers will be mixed effectively and uniformly.

One entrance preferably extends generally in the linear direction between such entrance and the exit, while another entrance preferably extends transversely to such linear direction.

A valve member is preferably mounted for adjusting movement between the members. The valve member is formed with passages which are movable into and out of registration with at least some of the polymerizing passages, to regulate the flow of the hydrocarbons therealong. The valve member is preferably in the form of a spindle rotatable in a bore between the opposed members. Means are preferably provided for adjusting the spindle, and also for clamping the spindle in its adjusted position. By rotating the valve, the rate of flow of the hydrocarbons can be regulated. The adjustment of the valve also controls the pressure in the polymerizing passages.

Further objects, features and advantages of the present invention will appear from the following description, taken with the accompanying drawings, in which:

FIG. 1 is a somewhat diagrammatic plan view of a polymerizing apparatus to be described as an illustrative embodiment of the present invention, portions of the apparatus being broken away to show the internal construction of the apparatus.

FIG. 2 is a side elevational view of the polymerizing apparatus.

FIG. 3 is a fragmentary enlarged longitudinal section, taken generally along the line 3—3 in FIG. 1.

FIG. 4 is an enlarged end view of the apparatus.

FIG. 5 is a fragmentary enlarged section, taken generally along the line 5—5 in FIG. 1.

FIG. 6 is a diagrammatic plan sectional view showing the manner in which the pillars and grooves on the opposed members are offset.

As already indicated, the drawings illustrate a polymerizing apparatus or system 10 which will find various applications, but is particularly useful for continuously polymerizing various hydrocarbon monomers. Such monomers include modified olefinic hydrocarbons, such as styrene, vinyl toluene, acrylates, and the like, which may be polymerized by themselves, or with one another, or in combination with various gaseous olefins, or modified gaseous olefins, such as ethylene, propylene, vinyl chloride, and the like. These liquid and gaseous monomers may also be polymerized with conjugated dienes, such as butadiene, isoprene, and the like. Many other monomers may be polymerized by the disclosed apparatus.

The polymerizing apparatus 10 comprises a housing or casing 12 through which the hydrocarbons are continuously fed so as to be polymerized therein, under the influence of heat and pressure. The illustrated housing 12 comprises a pair of similar members which are joined together in opposed relation along a parting plane or joint 16. The members 14 are suitably secured together, as by means of a plurality of bolts 18.

Polymerizing passages 20 are formed within the housing 12 to conduct or carry the hydrocarbon monomers through the housing. Preferably, the passages 20 are in the form of intersecting grooves or cutouts which are formed in the members 14. Pillars or projections 22 are formed between the intersecting grooves 20. The pillars 22 are preferably rectangular, the illustrated pillars being square in shape. The intersecting grooves 20 provide polymerizing passages which are quite tortuous or serpentine, so that the hydrocarbon monomers must come into intimate contact with the pillars 22 in passing through the housing 12. As shown to advantage in FIG. 3, the pillars 22 preferably have flat end surfaces 24 which are disposed substantially in the parting plane 16 between the members 14. The grooves 20 may be machined directly in the members 14, or in separate plates which may be recessed into the members 14.

The polymerizing members or plates 14 may be of any suitable size and shape. As illustrated, the members 14 are relatively elongated. At the opposite ends of the members 14, the polymerizing housing 12 is formed with inlet and outlet chambers 26 and 28, which preferably are in the form of recesses formed in the members 14. One or more entrances and exits communicate with the inlet and outlet chambers 26 and 28. As shown, there are three entrance openings 31, 32 and 33 through which hydrocarbon monomers may be introduced into the inlet chamber 20, from outside the housing 12. The illustrated entrances 32 and 33 are angularly related to the entrance 31. This arrangement promotes the thorough mixing of the incoming monomers. The entrance 31 is directed longitudinally along the length of the housing 12 and in the linear direction between the inlet and outlet chambers 26 and 28. The entrance openings 32 and 33 are directed transversely, generally perpendicular to the direction of the entrance opening 31.

The members 14 are preferably formed with distribution slots or grooves 36 which extend between the inlet chamber 26 and the beginning ends of the intersecting grooves 20. Additional pillars or projections 38 are formed between the distribution slots 36.

The polymerized hydrocarbons are discharged from the outlet chamber 28 through a single exit opening 41. As illustrated, the exit opening 41 is directed longitudinally. In the illustrated construction, two other openings 42 and 43 communicate with the outlet chamber 28, but are used for instrumentation. Thus, the opening 42 accommodates a thermocouple or other thermometer 44, while the opening 43 is connected to a pressure gage 46.

The illustrated grooves 20 intersect in generally perpendicular relation. Moreover, the grooves 20 extend diagonally to the linear direction between the inlet and outlet chambers 26 and 28. This arrangement promotes the thorough and uniform mixing of the hydrocarbon monomers.

The pillars 22 of the opposed members 14 are preferably offset, so that the pillars of each member 14 are opposite the grooves or conducts 20 in the other member. In this way, the pillars 22 surround the intersecting grooves 20 to the maximum possible extent, so as to maximize the heat transfer between the pillars and the hydrocarbons which are flowing along the grooves. By this arrangement, efficient and uniform heat transfer is provided between the pillars 22 and the hydrocarbon monomers flowing through the housing 12.

It is preferred to supply a liquid hydrocarbon monomer to the entrance opening 31. For this purpose, a pipe 51 is connected to the opening 31. Gaseous monomers are preferably introduced through the transverse entrance openings 32 and 33. For this purpose, pipes 52 and 53 are preferably connected to the openings 32 and 33.

Mounting plates 56, 57 and 58 are preferably employed to connect the pipes 51, 52 and 53 to the housing 12. The illustrated plates 56, 57 and 58 are secured to the housing by means of bolts or screws 60. The provision of the plates 56, 57 and 58 obviates any tendency of the insertion of the pipes 51, 52 and 53 to cause spreading of the plates or members 14.

A pump 62 is preferably employed to force the liquid hydrocarbon monomer into the housing 12 under pressure. The intake side of the pump 62 is connected to a supply line 64 which extends to a suitable tank or other source of the liquid monomer.

The discharge side of the pump 62 is connected to the pipe 51 through a check valve 66 and a pressure relief valve 68. The check valve 66 prevents reverse flow of the hydrocarbon. The pressure relief valve 68 relieves any excess pressure which may develop in the polymerizing housing 12.

In the illustrated apparatus, a pressure relief valve 70 is also connected between the discharge and intake sides of the pump 62 so as to prevent the development of excess pressure by the pump. A pressure gage 72 is preferably connected to the pipe 51 which leads into the housing 12.

At the outlet end of the polymerizing housing 12, a pipe 74 is preferably connected to the exit opening 41, by means of a mounting plate 76. The thermometer 44 and the pressure gage 46 are also connected to mounting plates 78 and 80.

An outlet valve 82 is preferably connected into the pipe 74 to regulate the discharge of the polymerized hydrocarbons from the housing 12. The valve 82 may be operated manually, or by means of a control system.

The polymerizing housing 12 is preferably provided with a control valve 86, which is illustrated as comprising a movable valve member 88. The illustrated valve member 88 is in the form of a spindle which is rotatably mounted in a bore 90 formed between the members 14. The valve spindle 88 extends transversely across the housing 12, substantially perpendicular to the linear direction between the inlet and outlet chambers 26 and 28.

As shown to best advantage in FIGS. 1 and 5, the valve member or spindle 88 is formed with a plurality of passages or grooves 92 which are movable into and out of registration with at least some of the polymerizing passages 20. By rotating the spindle 88, the flow of the hydrocarbon material through the polymerizing passages 20 can be regulated. Thus, the valve 88 may be employed to adjust the rate of flow of the material through the polymerizing housing 12. If the valve 88 is adjusted to reduce the rate of flow, the pressure in the polymerizing passages 20 tends to increase.

As shown in FIGS. 1 and 2, a knob or wheel 94 is preferably connected to one end of the valve spindle 88 for use in adjusting the valve spindle. Means are also provided to lock the valve spindle in its adjusted position. In the illustrated construction, clamping screws 98 are provided to lock the wheel 94. The screws 98 extend through slots 100 formed in the wheel 94. It will be seen that the screws 98 are tapped into the members 14.

FIG. 6 illustrates the manner in which the pillars or projections of the opposite members 14 are offset, so that each pillar will be opposite one of the grooves 20 in the opposite member. For clarity of this view, the upper pillars are designated 22a, while the lower pillars are designated 22b.

The operation of the polymerizing apparatus 10 has already been described, but it may be helpful to offer a brief summary. The opposed members 14 of the polymerizing housing 12 are preheated in any suitable manner, as by directing hot gases against the outside of the housing. The housing may also be heated electrically or with hot vapors.

The pump 62 is employed to force a liquid hydrocarbon monomer into the housing 12 through the axial entrance opening 31. At the same time, gaseous hydrocarbon monomers are forced into the housing 12 through the pipes 52 and 53. The pump 62 develops a suitable pressure within the polymerizing housing 12.

The liquid and gaseous monomers are thoroughly and uniformly mixed as they pass along the intersecting grooves 20, which constitute the polymerizing passages. The thorough mixing of the monomers is promoted by several factors, including the angular relation between the axial entrance 31 and the lateral entrances 32 and 33; the provision of the distribution slots 32; and the arrangement of the diagonal intersecting grooves 20, with the pillars 22 therebetween.

By virtue of the arrangement of the grooves 20 and pillars 22, the hydrocarbon monomers are thoroughly and uniformly heated. The pillars 22 are offset so that each pillar is opposite a groove in the opposite member 14. In this way, the heat transfer between the pillars and the hydrocarbon monomers is maximized.

Initially, the preheated members 14 of the housing 12 transfer heat to the hydrocarbon monomers. However, the polymerization of the monomers generates heat, by virtue of the chemical reactions involved. Such heat is normally sufficient to maintain the desired temperature of the polymerizing housing 12. The arrangement of the offset pillars 22 causes the heat to be spread uniformly.

The offsetting of the pillars 22 has the additional advantage of causing the hydrocarbon monomers to flow in different directions in the adjacent grooves 20 formed in the upper and lower members 14. Thus, as shown by the arrows in FIG. 6, the streams of hydrocarbon material in the grooves 20 formed in the upper member 14 flow across the streams of hydrocarbon material, flowing in the grooves 20 in the lower member. This crossing of the streams of hydrocarbon monomers results in thorough and uniform mixing of the hydrocarbon materials.

The rotatable valve spindle 88 is adjusted to provide the desired flow of the hydrocarbon materials through the polymerizing housing 12. By throttling down the valve 88, the polymerizing pressure in the housing 12 may be increased.

The hot polymerized hydrocarbon material is discharged from the housing 12 through the exit opening 41 and thence through the valve 82, which may be connected to any desired additional equipment for processing the polymerized material. Thus, for example, the polymerized material may be sprayed into a cooling chamber and collected in finely divided form for use in preparing paints or any other desired products. The hot liquid polymerized material may also be mixed directly with a suitable solvent for use in preparing paints or the like.

It will be evident that the apparatus of the present invention makes it possible to carry out the continuous polymerization of hydrocarbons on an extremely efficient and effective basis. The apparatus of the present invention provides an extremely high polymerizing capacity, while minimizing the size of the apparatus. By virtue of the arrangement of the intersecting grooves and pillars, the hydrocarbon monomers may be polymerized at high efficiency, and at extremely high flow rates.

Various other modifications, alternative constructions, and equivalents may be employed without departing from the true spirit and scope of the invention, as exemplified in the foregoing description and defined in the following claims.

I claim:
1. Polymerizing apparatus,
comprising the combination of a pair of opposed members having polymerizing passages therebetween,
first means for introducing hydrocarbons to be polymerized between said members,
and second means remote from said first-mentioned means for discharging the polymerized hydrocarbons from the passages between said members,
each of said members being formed with a plurality of intersecting grooves with pillars therebetween,
said grooves constituting said polymerizing passages,
said pillars of said opopsed members being offset,
the pillars of each member thereby being opposite the grooves of the other member to provide for effective heat transfer between said pillars and the hydrocarbons passing along said grooves.
2. Polymerizing apparatus according to claim 1, in which said grooves intersect in generally rectangular relation.
3. Polymerizing apparatus according to claim 1, in which said pillars are generally rectangular in shape.
4. Polymerizing apparatus according to claim 1, in which said grooves intersect in generally rectangular relation,
and in which said pillars are generally rectangular in shape.
5. Polymerizing apparatus according to claim 1, in which said grooves extend diagonally to the linear direction between said first and second means.
6. Polymerizing apparatus according to claim 1, in which said grooves intersect in generally rectangular relation,
and in which said grooves extend diagonally to the linear direction between said first and second means.
7. Polymerizing apparatus according to claim 1, in which said members are in the form of flat plates secured together in opposed relation.
8. Polymerizing apparatus according to claim 1, in which said members are secured together in opposed relation with a parting plane therebetween,
and in which said flat pillars have flat end surfaces disposed substantially in said parting plane.
9. Polymerizing apparatus according to claim 1, including a valve member movably mounted between said opposed members and having passages movable into and out of registration with at least some of said polymerizing passages for regulating the flow of the hydrocarbons therealong.
10. Polymerizing apparatus according to claim 1, including a valve spindle rotatably mounted between said opposed members and having passages movable into and out of registration with at least some of said polymerizing passages for regulating the flow of the hydrocarbons therealong.
11. Polymerizing apparatus according to claim 10, including means for adjusting said valve spindle, and means for securing said valve spindle in its adjusted position.
12. Polymerizing apparatus according to claim 1, including a valve spindle rotatably mounted between said opposed members,
said members having a bore therebetween for receiving said spindle,
said spindle extending transversely to the linear direction between said first and second means,
said spindle having passages therein movable into and out of registration with at least some of said grooves to regulate the flow of the hydrocarbons along said grooves.
13. Polymerizing apparatus according to claim 1, including a cylindrical valve member movably mounted between said opposed members,
said valve member having passages therein movable into and out of registration with at least some of said polymerizing passages to regulate the flow of the hydrocarbons therealong.
14. Polymerizing apparatus according to claim 1, in which said first means include at least two entrances for introducing hydrocarbons between said opposed members.
15. Polymerizing apparatus according to claim 1, in which said first means comprise at least two angularly related entrances for introducing different hydrocarbons between said opposed members.
16. Polymerizing apparatus according to claim 1, in which said first means comprise at least two entrances for introducing hydrocarbons between said opposed members,
one of said entrances being directed generally along the linear direction between said first and second means,
while another entrance is directed transversely to said linear direction.
17. Polymerizing apparatus according to claim 16, in which said grooves extend diagonally to the linear direction between said first and second means.
18. Polymerizing apparatus,
comprising the combination of first and second opposed members having polymerizing passages therebetween,
first means providing at least one entrance for introducing hydrocarbons into said polymerizing passages between said members,
second means remote from said first means and pro- viding at least one exit for the polymerized hydrocarbons from said passages,
each of said members being formed with a plurality of intersecting grooves with pillars therebetween,
said grooves constituting said polymerizing passages, and a valve member movably mounted between said opposed members and having passages movable into and out of registration with at least some of said grooves for regulating the flow of the hydrocarbons therealong.

19. Polymerizing apparatus according to claim 18, in which said valve member is in the form of a valve spindle rotatably mounted between said opposed members.

20. Polymerizing apparatus according to claim 18, including means for adjusting said valve member, and means for securing said valve member in its adjusted position.

References Cited

UNITED STATES PATENTS 3,251,657   5/1966   Bachmann et al. _____ 23—260

JAMES H. TAYMAN, JR., Primary Examiner

U.S. Cl. X.R.

23—284, 290; 165—170; 259—4, 150, 180; 260—195